(12) United States Patent
Garcia Morchon et al.

(10) Patent No.: US 9,077,520 B2
(45) Date of Patent: Jul. 7, 2015

(54) METHOD FOR SECURE COMMUNICATION IN A NETWORK, A COMMUNICATION DEVICE, A NETWORK AND A COMPUTER PROGRAM THEREFOR

(75) Inventors: Oscar Garcia Morchon, Eindhoven (NL); Bozena Erdmann, Eindhoven (NL); Klaus Kursawe, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 229 days.

(21) Appl. No.: 13/254,462

(22) PCT Filed: Mar. 16, 2010

(86) PCT No.: PCT/IB2010/051134
§ 371 (c)(1),
(2), (4) Date: Sep. 2, 2011

(87) PCT Pub. No.: WO2010/106496
PCT Pub. Date: Sep. 23, 2010

(65) Prior Publication Data
US 2011/0317838 A1  Dec. 29, 2011

(30) Foreign Application Priority Data
Mar. 19, 2009  (EP) .................................. 09155627

(51) Int. Cl.
*H04L 9/00* (2006.01)
*H04L 9/08* (2006.01)
*H04W 12/04* (2009.01)

(52) U.S. Cl.
CPC ............. *H04L 9/083* (2013.01); *H04L 2209/80* (2013.01); *H04W 12/04* (2013.01)

(58) Field of Classification Search
CPC ... H04L 9/083; H04L 9/0891; H04L 2209/80; H04L 2209/805; H04L 63/083; H04W 12/04

USPC ..................... 713/168, 153; 380/44, 259, 278
See application file for complete search history.

(56) References Cited

U.S. PATENT DOCUMENTS 7,409,526 B1 * 8/2008 Ng et al. ........................ 711/216
8,429,133 B2 * 4/2013 Lahiri et al. ................... 707/673
(Continued)

FOREIGN PATENT DOCUMENTS

WO   WO2010032161 A1   3/2010

OTHER PUBLICATIONS

David S. Sanchez et al, Key Management for Mobile Sensor Networks, pp. 14-26, Springer-Verlag, 2006.*
(Continued)

*Primary Examiner* — Shewaye Gelagay
*Assistant Examiner* — Shanto M Abedin
(74) *Attorney, Agent, or Firm* — Larry Liberchuk

(57) ABSTRACT

A method for securing communications between a first node (N1) and a second node (N2) in a network (1) further comprising a management device (2) provided with root keying materials, the method comprising the following steps: the management device generating, based on root keying materials, a first node keying material shares comprising a number of sub-elements and the first node keying material shares being arranged for generating a first complete key, the management device selecting a subset of sub-elements of the first keying material shares, the number of sub-elements selected being less or equal than the total number of sub-elements of the first keying material shares, and the selected sub-elements forming a first node partial keying material shares or symmetric-key generation engine, the first node generating, based on the first node symmetric-key generation engine and on an identifier of the second node, a first key, used for securing communications with the second node.

13 Claims, 6 Drawing Sheets

(56) References Cited

U.S. PATENT DOCUMENTS

| | | | |
|---|---|---|---|
| 2006/0023887 A1* | 2/2006 | Agrawal et al. | 380/277 |
| 2007/0297613 A1* | 12/2007 | Ghosh | 380/277 |
| 2008/0137863 A1* | 6/2008 | Thomas | 380/273 |
| 2008/0181413 A1* | 7/2008 | Yi et al. | 380/279 |
| 2009/0129599 A1* | 5/2009 | Garcia et al. | 380/279 |
| 2009/0167535 A1* | 7/2009 | Sanchez et al. | 340/573.1 |
| 2009/0264712 A1* | 10/2009 | Baldus et al. | 600/300 |
| 2010/0223458 A1* | 9/2010 | McGrew et al. | 713/153 |
| 2010/0290622 A1* | 11/2010 | Garcia Morchon et al. | 380/273 |
| 2010/0299519 A1* | 11/2010 | Xiao et al. | 713/155 |
| 2011/0113475 A1* | 5/2011 | Garcia Morchon et al. | 726/4 |

OTHER PUBLICATIONS

Ashok Kumar Das, ECPKS: An Improved Location-Aware Key Management Scheme in Static Sensor Networks, pp. 358-369, International Journal of Network Security, 2008.*

Hu Tong-sen et al, An Enhanced Polynomial-based Key Establishment Scheme for Wireless Sensor Networks, pp. 809-812, IEEE, 2008.*

Hangyang Dai et al, A Key Predistribution Scheme with Matrix Decomposition for Secure Wireless Sensor Networks, pp. 1724-1727, IEEE, 2008.*

Farshid Delgosha et al, MKPA: A multivariate Polynomial Scheme for Symmetric Key-Establishment in Distributed Sensor Networks, pp. 236-241, ACM, 2007.*

Mohamed Eltoweissy et al, Dynamic Key Management in Sensor Networks, pp. 122-130, IEEE Communications magazine, IEEE, 2006.*

Claude Castelluccia et al, Self-configurable Key Pre-distribution in Mobile Ad Hoc Networks, pp. 1083-1095, International Federation for Information Processing, 2005.*

David Sanchez Sanchez: "Key Management for Wireless Ad hoc Networks", [Online] Jun. 29, 2006, pp. 1-118, XP002554327.

Donggang Liu et al: "Establishing Pairwise Keys in Distributed Sensor Networks", ACM Transactions on Information and System Security, ACM, New York, NY, US, vol. 8, No. 1, Feb. 1, 2005, pp. 41-77, XP002381241.

* cited by examiner $$
\begin{array}{r}
\begin{array}{|c|c|c|}\hline a_{01\text{-}1} & a_{01\text{-}2} & a_{01\text{-}3} \\\hline\end{array} \\
\times \quad \begin{array}{|c|}\hline R \\\hline\end{array} \\ \hline
\begin{array}{|c|c|c|}\hline a'_{01\text{-}1} & a'_{01\text{-}2} & a'_{01\text{-}3} \\\hline\end{array} \\
+ \begin{array}{|c|c|c|}\hline a_{00\text{-}1} & a_{00\text{-}2} & a_{00\text{-}3} \\\hline\end{array} \\ \hline
\begin{array}{|c|c|c|}\hline b_{R\text{-}0\text{-}1} & b_{R\text{-}0\text{-}2} & b_{R\text{-}0\text{-}3} \\\hline\end{array}
\end{array}
\qquad
\begin{array}{r}
\begin{array}{|c|c|c|}\hline a_{11\text{-}1} & a_{11\text{-}2} & a_{11\text{-}3} \\\hline\end{array} \\
\times \quad \begin{array}{|c|}\hline R \\\hline\end{array} \\ \hline
\begin{array}{|c|c|c|}\hline a'_{11\text{-}1} & a'_{11\text{-}2} & a'_{11\text{-}3} \\\hline\end{array} \\
+ \begin{array}{|c|c|c|}\hline a_{01\text{-}1} & a_{01\text{-}2} & a_{01\text{-}3} \\\hline\end{array} \\ \hline
\begin{array}{|c|c|c|}\hline b_{R\text{-}1\text{-}1} & b_{R\text{-}1\text{-}2} & b_{R\text{-}1\text{-}3} \\\hline\end{array}
\end{array}
$$

$$
\begin{array}{r}
\begin{array}{|c|c|c|}\hline b_{R\text{-}1\text{-}1} & b_{R\text{-}1\text{-}2} & b_{R\text{-}1\text{-}3} \\\hline\end{array} \\
\times \quad \begin{array}{|c|}\hline V \\\hline\end{array} \\ \hline
\begin{array}{|c|c|c|}\hline W'_2 & W_3 & W_4 \\\hline\end{array} \\
+ \quad \begin{array}{|c|}\hline W_1 \\\hline\end{array} \\ \hline
\begin{array}{|c|c|c|}\hline b_{R\text{-}0\text{-}1} & b_{R\text{-}0\text{-}2} & b_{R\text{-}0\text{-}3} \\\hline\end{array} \\ \hline
\begin{array}{|c|c|c|}\hline K_1 & K_2 & K'_3 \\\hline\end{array} \\
+ \quad \begin{array}{|c|}\hline z1 \\\hline\end{array} \\ \hline
\begin{array}{|c|c|c|}\hline K_1 & K_2 & K_3 \\\hline\end{array}
\end{array}
$$

FIG. 3

$$\begin{array}{c|ccc}
 & a_{01\text{-}1} & a_{01\text{-}2} & a_{01\text{-}3} \\
 & & & ID1 \\
\times & & & \\
\hline
 & a'_{01\text{-}1} & a'_{01\text{-}2} & a'_{01\text{-}3} \\
+ & a_{00\text{-}1} & a_{00\text{-}2} & a_{00\text{-}3} \\
\hline
 & b_{ID1\text{-}0\text{-}1} & b_{ID1\text{-}0\text{-}2} & b_{ID1\text{-}0\text{-}3} \\
\end{array}
\qquad
\begin{array}{c|ccc}
 & a_{11\text{-}1} & a_{11\text{-}2} & a_{11\text{-}3} \\
 & & & ID2 \\
\times & & & \\
\hline
 & a'_{11\text{-}1} & a'_{11\text{-}2} & a'_{11\text{-}3} \\
+ & a_{01\text{-}1} & a_{01\text{-}2} & a_{01\text{-}3} \\
\hline
 & b_{ID1\text{-}1\text{-}1} & b_{ID1\text{-}1\text{-}2} & b_{ID1\text{-}1\text{-}3} \\
\end{array}$$

$$\begin{array}{c|ccc}
 & b_{ID1\text{-}1\text{-}1} & b_{ID1\text{-}1\text{-}2} & b_{ID1\text{-}1\text{-}3} \\
 & & & ID2 \\
\times & & & \\
\hline
 & W'_2 & W_3 & W_4 \\
+ & & & W_1 \\
 & b_{ID1\text{-}0\text{-}1} & b_{ID1\text{-}0\text{-}2} & b_{ID1\text{-}0\text{-}3} \\
\hline
 & K_1 & K_2 & K'_3 \\
+ & & & z1 \\
\hline
 & K_1 & K_2 & K_3 \\
\end{array}$$

FIG. 4a

METHOD FOR SECURE COMMUNICATION IN A NETWORK, A COMMUNICATION DEVICE, A NETWORK AND A COMPUTER PROGRAM THEREFOR

FIELD OF THE INVENTION

The present invention relates to a method for secure communications and communication networks having communication devices, using secure means like encryption system for securing communications. This invention finds an advantageous application in communication networks such as mobile wireless sensor and actuator networks (WSNs), and more particularly in medical wireless networks for patient monitoring or other personal networks such as lighting environment networks, building automation networks, car equipment network.

BACKGROUND OF THE INVENTION

Due to these sensitive applications, networks of the like must be provided with security services like confidentiality, authentication, integrity, and authorization.

Encryption systems used in conventional communication networks typically enable security services based on cryptographic methods for securing the communications. Cryptographic methods require cryptographic keys for their operation.

More particularly, in some networks comprising parties, or nodes, having to be very cost-efficient, symmetric cryptography is therefore usually applied to enable required security services. Indeed, in networks of the like, such as wireless sensor networks, nodes are typically resource-constrained, namely in terms of battery power, communication bandwidth, processing power, or memory. Security methods based on asymmetric cryptography are thus generally considered either inefficient or infeasible in such nodes.

The fundamental issue in symmetric cryptography lies in key-distribution, i.e. in the establishment of shared secrets in nodes belonging to a network and having to communicate securely. This problem is particularly eminent in WSNs, since their size can vary from tens to several tens of thousands of nodes, and their nature can be very dynamic, e.g. the network topology may not be known a priori.

Cryptographic keys are distributed and established between the parties involved by means of different methods based on public-key cryptography, a key distribution center or other symmetric techniques. In particular, research has been carried out on the design of key distribution schemes for sensor networks during the last years. Random key pre-distribution schemes, trust center based key distribution schemes or the application of public-key cryptography have been proposed. In many of those schemes, we find a trade-off between security and performance. For instance, random key pre-distribution schemes distribute a number of W keys randomly chosen from a pool of M keys to each node in the WSN. Thus, two nodes have a probability p of sharing a common key, which depends on W and M, and of being able to establish a secure communication link. However, these schemes can be broken by capturing nodes, and the stored keys. Besides, it requires the storage of a relatively high number of keys, for example between 50 and 200, equivalent to 500 or 2000 bytes for 100-bit keys. Public-key based key agreement schemes require the storage of a single key, but the algorithms for key generation are quite complex. Besides, the system is still slow from the computational point of view, since a few seconds are required for a key agreement handshake. Some conventional key distribution schemes are keying material share distribution schemes called alpha-secure, in which a node belonging to a network is not directly provided with cryptographic ready-made key, but with some node-specific keying material allowing it to compute a shared key with another node of the network, for securing communications. This node-specific information is a keying material share derived from a root keying material comprised in a management device of the network. These alpha-secure schemes offer a trade-off between performance, availability, and security. The main drawback of those systems refers to the fact that the root keying material is such that the capture of alpha nodes, and thus the combination of alpha keying-material shares, compromises the whole root keying material.

SUMMARY OF THE INVENTION

It is an object of the invention to propose a method for securing communications in a network overcoming the drawback above-mentioned, and thus increasing the performance of the conventional key-distribution schemes.

It is another object of the invention to provide a network in which the capture of any number of nodes does not compromise the network.

Yet another object of the invention is to establish an efficient key-distribution, that achieves a much stronger security level than prior art alpha-secure key-distribution schemes while minimizing the resource requirements for the nodes of the network.

To this end, the present invention provides a method for securing communications between a first node and a second node in a network further comprising a management device provided with a symmetric key generation engine (SKGE). A symmetric key generation engine SKGE(·) is a cryptographic block that allows a first party, Alice, to generate a pairwise key with any other party in the network, e.g., Bob, with three desired operational properties. First of all, it is computationally much more efficient than an asymmetric handshake for key agreement. Second of all, the key generation engine can be stored in a very efficient way, i.e., it requires the storage of a few bytes when compared with the N - 1 keys of a trivial symmetric key distribution scheme. Thirdly, the engine is hard to be broken.

For the sake of generality we define the SE of an entity $R_A$, for example a node, as a structure that allows the entity $R_A$ for fast and efficient generation of symmetric keys with any other entity $R_B$ in the system, given the identity of the other party. The SKGE of entity $R_A$ is based on same secret keying material $KM_A$. This secret information is the combination of a number n of sets of keying material $K_{A-j}$ generated from n independent keying material shares $KM'_{A-j}$. Keying material shares $KM'_{i-j}$ for different entities $R_i$ are generated from some root keying material $KM_j^{root}$.

Root keying material $KM_{a-j}$ and keying material shares $KM'_{i-j}$ are, for example, based on well-known mathematical functions used in cryptography. These mathematical functions might include polynomials, matrixes, combinatorial structures, or the like. Mathematical operations can be carried out over any finite field or other mathematical structure such as algebraic structures including groups, fields, rings, vector spaces, etc.

The operation of a SKGE comprises the following steps:
the management device generating, based on root keying material, e.g., polynomial root keying materials, and on an identifier of the first node, a set of keying material shares for the first node, e.g., under the form of a first polynomial, each first keying material share being divided into sub-elements.

the management device selecting a subset of sub-elements of the first keying material shares, e.g., polynomial coefficients, the number of sub-elements selected for each first keying material share being less or equal than the total number of sub-elements of that first keying material share, and the selected sub-elements forming a first node partial keying material share or symmetric-key generation engine, the management device transmitting the first node partial material share to the first node, and the first node generating, based on the first node partial keying material share or symmetric-key generation engine and on an identifier of the second node, a first key, used for securing communications with the second node.

Such a method for a symmetric-key generation engine increases the resiliency of the key-distribution scheme, because a node is provided only with part of the first node keying material share, thus even the capture of a high number of nodes does not allow an attacker to retrieve the initial root keying material.

Besides, a symmetric-key generation engine can combine a number of elements coming from different keying material shares generated from different root keying materials mixing operations, e.g., carried out over different finite fields.

An additional security feature refers to the configurable security level by means of using keying material shares and root keying material shares of different complexity. For instance, if the root keying material is a polynomial, the chosen polynomial degree can be used to provide a trade-off between computational complexity and security.

Moreover, since the node is provided with a smaller number of elements, thus with a smaller number of bits, its memory requirements for storing these elements are minimized, and the computational requirements for generating the partial key are also reduced.

In another embodiment, the root keying material is a symmetric bivariate polynomial. Such a characteristic induce that, if the second node is provided with a partial keying material share, computed in the same way as the first node keying material share, and generates a second partial key accordingly, this second key is equal to the first key.

In yet another embodiment of the invention, the root keying material is a polynomial of degree 1 with coefficients in a Finite Field $GF(q)_n$, where $q_n$ is a prime number equal to $2^n-1$, where n is an integer.

In another embodiment, the symmetric-key generation engine of an entity is designed by combining elements coming from a number of polynomial shares generated from a number of bivariate polynomials of different degree and over different finite fields. The combination is carried out in such a way that the actual generation of the polynomial shares is carried out in the corresponding fields, but the symmetric-key generation engine combines elements and operations that are common to all those fields.

Another aspect of the invention relates to a management device provided with a root keying material, in a network further comprising a node. The management device comprises:

means for generating, upon receipt of an identifier of the node, a node keying material share based on the root keying material, each keying material share divided into sub-elements, said node keying material share;

means for selecting a subset of sub-elements of the first keying material share for the design of the symmetric-key generation engine. The number of sub-elements selected from each keying material share being less or equal than the total number of sub-elements of this sub-identifier to form a node partial keying material share adapted for generating a first key, means for distributing the node partial keying material share to the node.

Another aspect of the invention relates to a network comprising a management device as described above, and a communication device. The communication device is provided with an identifier and a symmetric-key generation engine, and comprises:

means for transmitting its identifier to the management device, means for receiving, from the management device, a node partial keying material share, means for receiving an identifier of the another node, and means for generating, based on the received symmetric-key generation engine, or node partial keying material share, and the received other node's identifier, a key for communicating with the other node.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 3 shows a conventional key generation process in a basic symmetric-key generation engine.

FIG. 4a shows a key generation process according to the invention.

DETAILED DESCRIPTION OF THE INVENTION

Figure 1:
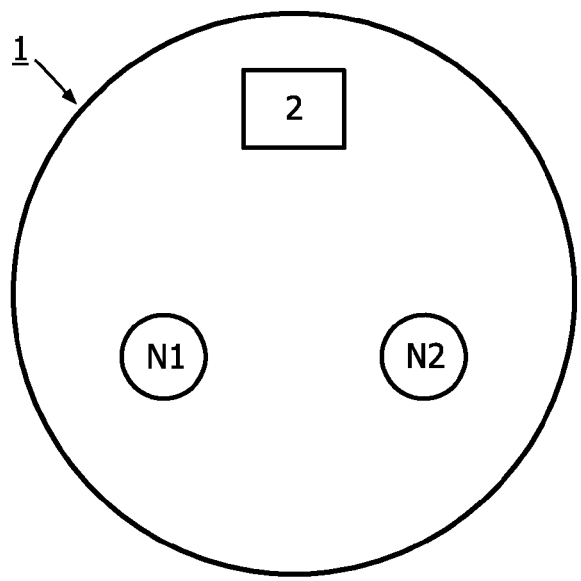
FIG. 1 represents a network according to the invention, comprising a management device and two nodes.
Figure 2:
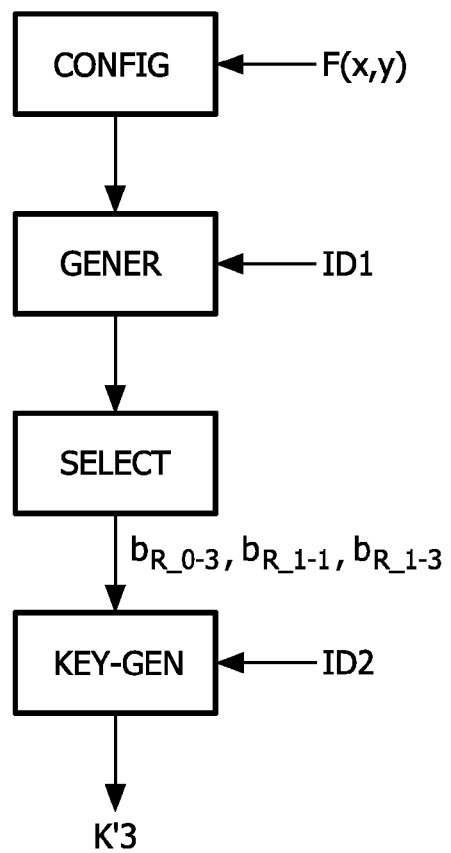
FIG. 2 is a block diagram showing a sequence of a method according to the invention for a basic symmetric-key generation engine.

The present invention relates to a method for securing communications in a network. An exemplary operating sequence of such a method will be described in conjunction with FIG. 1 showing a network according to the invention, and FIG. 2 showing a block diagram of an operating sequence of the network. FIG. 2 includes some exemplary elements used in the design of a basic symmetric-key generation engine.

This network comprises a management device 2, provided with a root keying material during a configuration phase CONFIG. In an exemplary embodiment, the root keying material is a symmetric bivariate polynomial F(x,y) of degree 1 with coefficients in a finite field GF(q). The polynomial can be written as follows: $F(x,y)=a_{00}+a_{01}x+a_{10}y+a_{11}xy$ where $a_{01}=a_{10}$.

In one embodiment, the characteristic of the field GF(q) is a prime Mersenne number $q_n=2^n-1$, where n is an integer, for example n=17, 127 or 521.

During this configuration phase CONFIG, each node (N1, N2) of the network is respectively provided with an identifier (ID1, ID2). Those identifiers are r-bits long, where r is an integer less than n. In an example, r is equal to the integer part of n/3. This configuration phase generally occurs during a pre-deployment phase of the network, i.e. before the nodes have actually joined the network.

Once the nodes are deployed, the management device generates, during a GENER phase, a complete keying material share for node N1, based on the root keying material F(x,y) and on the identifier ID1. The complete keying material share for node N1 is $f_{ID1}(y)=b_{ID1\_1}*y+b_{ID1\_0}$, where the coefficients of this polynomial are computed as follows : $b_{ID1\_1}=a_{10}+a_{11}*ID1$ (mod q) and $b_{ID1\_0}=a_{00}+a_{01}*ID1$ (mod q). Those operations are performed modulo q, like all other operations carried out in such a method, because the system takes place over a finite field GF(q).

We will now shortly describe a key generation process according to a conventional method, to explain then the improvements of the present invention based on SKGEs.

Such a conventional process will be described with reference to FIG. 3, with the following assumptions:
- the root keying material provided in the management device is $F(x,y)=a_{00}+a_{01}x+a_{10}y+a_{11}xy$, which can be factorized under the form $F(x,y)=(a_{00}+a_{01}x)+(a_{10}+a_{11}x)y$.
- the coefficients of F(x,y) are expressed under the form of three segments concatenated.
- the network comprises two nodes whose identifiers are R and V.

The first step consists in generating the keying material share for the node R, by evaluating F(x,y) in x=R, then generating $F_R(y)=b_{R\_0}+b_{R\_1}*y$.

This evaluation is shown on the uppert part of FIG. 3 with:
- on the left upper part, the computation of $b_{R\_0}=(a_{01}R+a_{00})$ (mod q), and
- on the right upper part, the computation of $b_{R\_1}=(a_{11}R+a_{10})$ mod(q).

Then, in a conventional system, the complete keying material share generated by the management device is transmitted to the R node, i.e. the six segments: $b_{R\_0-1}$, $b_{R\_0-2}$, $b_{R\_0-3}$, $b_{R\_1-1}$, $b_{R\_1-2}$, $b_{R\_1-3}$.

When a communication has to be established between the node R and the node V, the identifier V is provided to the node R, so that it can generate a complete key for securing the communication. This key is a pair wise key, on which both nodes agree. It is computed by evaluating the keying material share of node $F_R(y)$ in y=V. This computation is shown on the lower part of FIG. 3. The calculation $b_{R\_1}*V+b_{R\_0}$ provides a key K composed of three concatenated segments K1, K2 and K3.

Elements W1 and z1 correspond to carries, than depend on the size of the finite field.

Figure 4B:
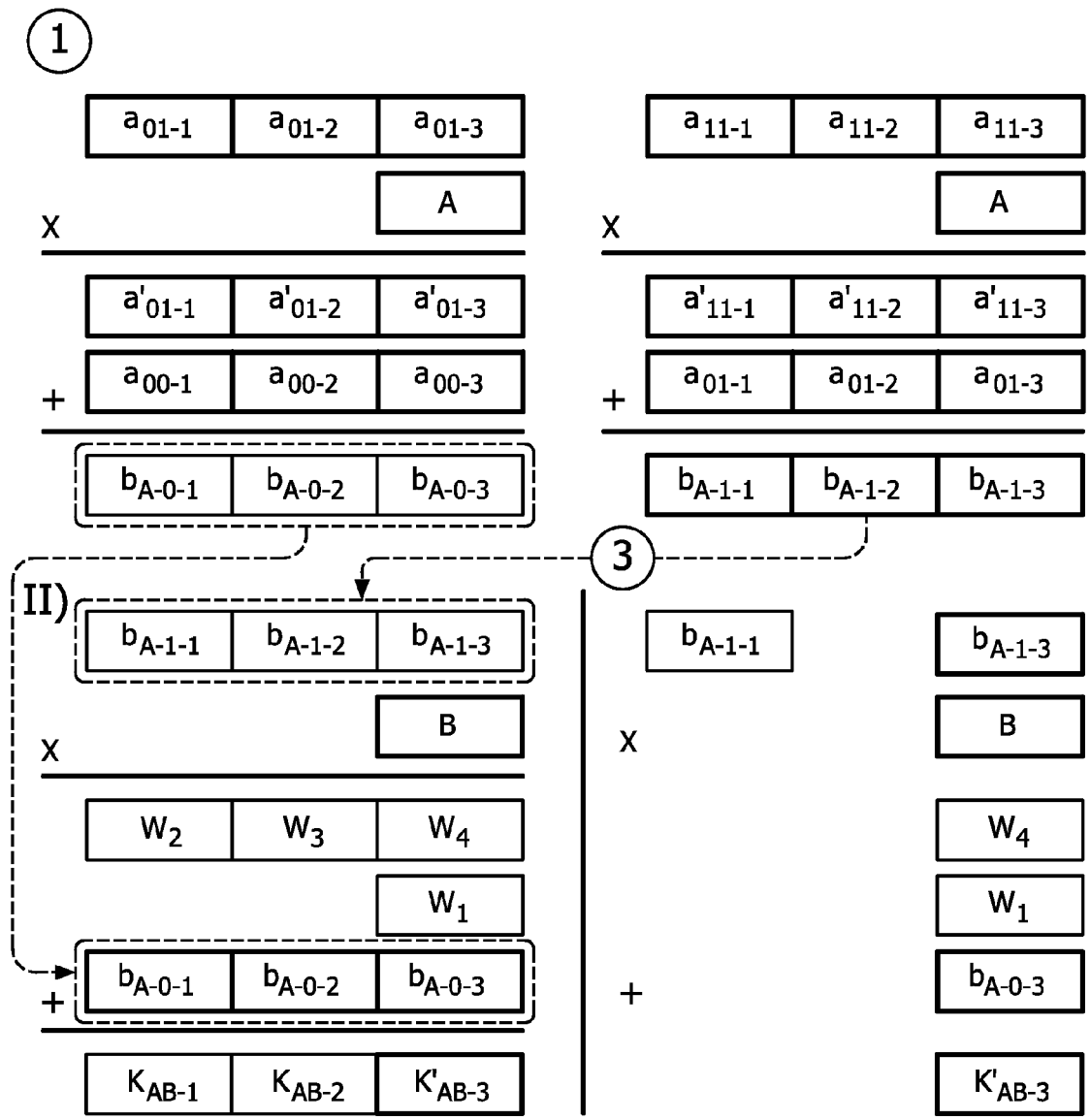
FIG. 4b shows another key generation process according to the invention

In such a conventional system, all the segments of the complete keying material share of a node are transmitted to this node. Accordingly, if a high number of nodes are captured, then an attacker may compromise the root keying material and thus the whole system. In the present case, 2 captured nodes would be enough to compromise the root keying material, since polynomials of degree 1 are used. We will now describe, with reference to FIGS. 2 and 4, the improvements proposed by the present invention to overcome, among other drawbacks, this security issue.

Going back to the operating sequence of FIG. 2, after having generated the complete keying material share of node N1, with ID1, the management device selects, in a SELECT step, some segments of the different coefficients, to generate a partial keying material share.

Those segments, also called sub-elements, are chosen so as to allow the generation a part of the complete key. Thus, in an exemplary embodiment, the management device distributes to node N1 only the following coefficients: $b_{ID1\_0-3}$, $b_{ID1\_1-1}$ and $b_{ID1\_1-3}$, shown in bold square on FIG. 4. Those elements, forming a partial keying material share, are then distributed to node N1.

Then, when a communication has to be established between nodes N1 and N2, the identifier ID2 is transmitted to N1, and the key generation process (KEY GEN) is performed. As can be seen on FIG. 4, being provided only with $b_{ID1\_0-3}$, $b_{ID1\_1-1}$ and $b_{ID1\_1-3}$, node N1 can not compute all key elements K1, K2 and K3, but can generate the most significant bits of the key, K3. The reader can understand this by analysing the relation between the different parts of the coefficients and the modular operations carried out. Partial key K3 is then used for encrypting communications between node N1 and node N2.

In the same way, the management device also generates, in one embodiment, a second node keying material share based on the root keying material share and on an identifier of the second node, the second node keying material share being under the form of a second polynomial, having the same number of coefficients as the first coefficients. The second keying material share is arranged for generating a second complete key. The second polynomial coefficients of this second node keying material share are divided similarly as the first polynomial coefficients, i.e. each coefficient is divided into three sub-elements. Then the management device selects some sub-elements of the second polynomial coefficients to form a second node partial keying material share and to transmit it to the second node.

The sub-elements selected for the second polynomial coefficients correspond to the sub-elements selected to form the first node partial keying material share. In this context, the term "corresponding elements" means the sub-elements that are in the same position, i.e. $b_{ID2\_0-3}$, $b_{ID21-1}$ and $b_{ID2\_1-3}$, which represent the third element of the first coefficient, and the first and third elements of the second coefficient.

Based on the second node keying material share and on the identifier of the first node, the second node generates a second partial key, used for securing communications with the first node. Since the root keying material is a symmetric polynomial, and since corresponding sub-elements are chosen from the first node partial keying material share and the second node keying material share, the second partial key is equal to the first partial key. Moreover, this second partial key is a part of the second complete key.

Note that the present embodiment only uses the most significant bits of the resulting key, i.e., two parties using the present embodiment of a simple symmetric-key generation engine can only agree on the most significant bits of K3. This is because the operations are carried out "out of the original field" GF(q) and part of the information is lost. In particular, both parties do not store any information to include the effect of carries in the key generation phase. However, this effect is minimal since the probability of carry propagation decreases with the number of bits. In particular, it can be proven that two nodes can agree on a common key with probability $1-2^{-b}$ after removing the b least significant bits of the resulting keys.

Moreover, the proposed system of the invention also allows improving the performance of conventional alpha-secure systems. Actually, since only a partial keying material share is provided to a node, the memory resources for storing the keying material share and the computational requirements for computing the keys are smallest than in a conventional system.

Table 1 below details the storage requirements and computational requirements of three configurations of a system according to this first embodiment:

| Finite field size | $q = 2^{127} - 1$ | $q = 2^{521} - 1$ | $q = 2^{127} - 1$ |
|---|---|---|---|
| Number of segments | 1 | 1 | 3 |
| {ID, $b_{R-1-3}$, $b_{R-0-3}$} size | [127/3] = 42 bits | [127/3] = 173 bits | [127/3] = 42 bits |
| $b_{R-1-0}$ size | 43 bits | 175 bits | 43 bits |
| Storage requirements (combined) | 127 bits | 521 bits | 381 bits |
| Key size ($K'_3$) | Around 40 bits | Around 160 bits | Around 120 bits |
| Computational requirements | 42 × 42 bit multiplication | 173 × 173 bit multiplication | 3 42 × 42 bit multiplication |
| | 42 × 43 bit multiplication | 175 × 173 bit multiplication | 3 42 × 43 bit multiplication |
| | 42 + 42 bit addition | 173 + 173 bit addition | 3 42 + 42 bit addition |

Those three configurations allow minimizing the memory, since only a few bits are required, and the computational requirements, because only two non-modular multiplications and one addition have to be performed.

The security of this basic embodiment of a symmetric key generation engine relies on the fact that an attacker cannot recover the original root keying material from the partial keying material shares distributed to the nodes, i.e., the information used for the SKGE.

In order to illustrate the security of a SKGE we first compare this concept with the well-known concept of block cipher. A block cipher is an encryption scheme working with blocks of plaintext of fixed length. A block cipher consists of two transformations: an encryption transformation $c = E_K(m)$ and a decryption transformation $m' = D_K(c)$. K is a secret key used in both transformations. A party, Alice, might use $E_K(\cdot)$ to encrypt a message with a key K and send it to Bob. Bob can use the same key and the decryption transformation $D_K(\cdot)$ to decrypt the received encrypted message and obtain the original message. If we assume a plain-text attack, i.e., the attacker knows pairs of unencrypted and encrypted messages $\{m_i, e_i\}$, the attacker might try to recover the secret key K. Attacking a SKGE is somehow similar. An attacker can capture a number of nodes getting a number of $N_0$ pairs $[R_i, KM_i]$ where $KM_i$ is the keying material used in the SKGE of entity $R_i$. An attacker aims at reconstructing the root keying material used in the generation of the symmetric key generation engine of each entity in the system by using the captured $N_c$ pairs $\{R_i, KM_i\}$. If we compare this attack with an attack against a block cipher, we might say that the SKGE's root keying material plays the same role as the encryption key in a block cipher. Besides, the pairs of $\{R_i, KM_i\}$ would be equivalent to the pairs of plain/cipher text.

As explained above, this basic SKGE might be attacked by compromising a number N_c of pairs $\{R_i, MK_i\}$. Here, we only outline the attack flow:

Preknowledge:
 KM$_i$ comprises three sub-elements $\{b_{ID_2,0,3}, b_{ID_2,1,3}, b_{ID_2,1,3}\}$ as depicted in FIG. 3. $\{b_{ID_2,1,3}, b_{ID_2,1,3}\}$ are part of the coefficient $b_1 = a_{11} * ID + a_{01} \pmod{q}$ of the polynomial share of degree 1 linked to node $ID_1$.

Experiments show that the security of the system strongly depends on the coefficient $a_{11}$ of the root keying material. This can be easily understood as only all the bits of $a_{11}$ are involved in the generated keys. The strong effect of $a_{11}$ on the system security is also due to the fact that this is the only element on which a modular operation is carried out. Therefore, an attacker can break this specific SKGE by recovering $a_{11}$.

Process to recover $a_{11}$ by capturing a number $N_0$ of pairs $\{R_i, KM_i\}$.

Let us take the sub-elements $\{b_{ID_2,1,3}, b_{ID_2,1,3}\}$ of two entities $R_A$ and $R_B$. Since those sub-elements come from $b_{R-1} = a_{11} * R + a_{01} \pmod{q}$, we can calculate the difference between them, i.e., $\{b_{R_A,1,3}, b_{R_A,1,3}\} - \{b_{R_B,1,3}, b_{R_B,1,3}\}$, and thus obtain a result highly correlated to $b_{R_A-1} - b_{R_B-1} = a_{11} * (R_A - R_B) \pmod{q}$. The resulting $\{b_{R_A,1,3}, b_{R_A,1,3}\} - \{b_{R_B,1,3}, b_{R_B,1,3}\}$ is 2*k. bit long, while $b_{R_A-1} - b_{R_B-1}$ is 3*k bit long with k=[n/3]. We can write:

$$\{b_{R_A,1,3}, b_{R_A,1,3}\} - \{b_{R_B,1,3}, b_{R_B,1,3}\} = a'_{11} * (R_A - R_B) \pmod{q}$$

Then, by calculating the inverse value of $(R_A - B_B)$ over GF(q), we can directly obtain:

$$[\{b_{R_A,1,3}, b_{R_A,1,3}\} - \{b_{R_B,1,3}, b_{R_B,1,3}\}] * (R_A - R_B)^{-1} = a'_{11} \pmod{q}$$

k bits (out of n≈3*k) of $a_{11}$ can be obtained in this way.

For the remaining 2*k bits the attacker could do the following: look for pairs of entities $\{R_A, R_B\}$ in such a way that the difference between $R_A$ and $R_B$ tends to 1. This can be carried out in a number of steps. At the end, the attacker can generate or find a pair $(R_A - R_B) = 1$, so that the corresponding values linked to those two identifiers equal $a_{11}$.

$$\{b_{R_A,1,3}, b_{R_A,1,3}\} - \{b_{R_B,1,3}, b_{R_B,1,3}\} = a'_{11} * 1 \pmod{q}$$

The expected number of pairs required to do this should be around 2*k.

Another attack might be based on the interpolation of different points. Over a finite field, any function may be represented as a polynomial function. Such a polynomial function can be generated by using Lagrange interpolation.

This attack against the above basic SKGE can be compared with other attacks to other cryptographic structures such as block ciphers. In many block cipher the security of the system depends on the number of rounds used to encrypt a message. A same block cipher using a few rounds might be vulnerable to different kind of attacks such as linear, differential or interpolation attacks.

In the same way, in different embodiments of the present invention, a secure key generation engine may comprise one or several of the following feature, to enhance its security:

The use of more complex root keying material functions, e.g., use polynomials of degree>1 to increase the system security. Increasing the degree of the polynomials might be comparable to increasing the number of rounds of a block cipher.

The smart combination of elements of keying material shares generated over different mathematical structures, such as rings or fields, of equal or different size, with common or different operations, with equal or different complexity, to achieve a better mixing of information. For instance, a root keying material based on a number of bivariate polynomials over different fields might be used. a number of polynomial shares are generated for a number of entities by evaluating the bivariate polynomials in the identity of each of those entities. Sub-elements of those polynomial shares over different finite fields are then combined to create the SKGE of each entity.

Still another extension refers to the design of the operations in the SKGE in such a way that an attacker cannot recover the actual keying material. This optimization refers to the mix and combination of the operations carried out in the SKGE itself to make impossible for an attacker to discover from which keying material shares of which root keying material those SKGE's sub-elements where generated.

Some of these teachings might be better understood if we compare them with the operation of of block ciphers. For instance, block ciphers use a number of rounds in the encryption or decryption transformations. The higher the number of rounds, the higher the security. Block ciphers also aim at mixing bits to create confusion and make the recovery of the secret key hard. This are also our goals when we introduce more complex functions in the design of SKGE. Next, we introduce a number of more complex SKGE embodiments using the above extensions.

SKGE Based on Polynomials of Large Decree

The basic embodiment uses as root keying material a bivariate polynomial of degree a=1, i.e., $f(x,y)=\Sigma_{ij}^1 a_{ij}x^iy^j$ (mod q). In this embodiment, q is a prime number in the form $2^k-1$ and the system identifiers are chosen to be $$\left[\frac{n}{3}\right]$$

bit long. As explained before, such a configuration allows limiting the effect of the wrapping modular operation to a number of bits. Following this reasoning, the ratio between the field size in bits and the identifier size, equal to k bits, must decrease. In particular, we can make this ratio equal to $3*\alpha$, where $\alpha$ is the polynomial degree. If we assume $\alpha=3$, and we have a polynomial $f(x,y)=\Sigma_{ij}^{a=3} a_{ij}x^iy^j$ (mod q) and we evaluate it in x=R, with $$R\frac{[\log q]}{2*\alpha+1}$$

bit long, then we obtain a polynomial share $g(y)=\Sigma_i^{a=3} b_j y^j$ (mod q). Each coefficient $b_j$ is calculated as $b_j=\Sigma_{i=0}^{a=3} a_{ij}R^i$ (mod q). Such a design can allow to create a SGKE with an output key of around [logq/ratio] bits. Ratio is, without lost of generality, equal to $2*\alpha+1$. For $\alpha=1$, ratio is equal to 3 (basic embodiment).

In particular, the sub-elements that conform the SKGE can be denoted as: $c_0=b_0(\text{mod}2^k)$ $c_{10}=b_1(\text{mod}2^k)$; $c_{11}=b_1>>(n-k)$; $c_{20}=b_2(\text{mod}2^k)$; $c_{21}=b_2>>(n-2k)$; $c_{30}=b_3(\text{mod}2^k)$; and $c_{31}=b_3>>(n-3k)$. The SKGE for node N1 can be used to generate a key with N2 as $K'_{N1,N2}=c_0+c_{10}N2+c_{11}N2>>k+c_{20}N2^2(\text{mod } 2^k)+(c_{21}N2^2>>2k)(\text{mod}2^k)+c_{30}N2^3(\text{mod } 2^k)+(c_{31}N2^3>>3k)(\text{mod } 2^k)$.

In this particular example, it can be seen that the complexity of the key generation increases, thus requiring more computational requirements, but achieving a better mixing.

In general, the operation for an SKGE of node N1 that uses as root keying material a bivariate polynomial of degree $\alpha$ over finite field $GF(2^n-1)$ to generate a key with node N2 can be written as:

$$SKGE_{N1}(N2) = C_0 + \sum_{i=1}^{\alpha} C_{i0}N2^i + \sum_{j=1}^{\alpha} C_{j1}N2^j(>>j*k) \; (\text{mod}2^k)$$

Here, $$k = \frac{n}{2*\alpha+1}$$

without loss of generality. The values $\{C_0, C_{10}, \ldots, C_{i0}, \ldots C_{\alpha0}, C_{11}, \ldots, C_{j1}, \ldots C_{\alpha1}\}$ comprise the sub-elements of the SKGE of entity N1, and depend on the coefficients of the original polynomial share as:

$$SKGE_{N1}(N2) = b_0(\text{mod}2^k) + \sum_{i=1}^{\alpha}(b_i(\text{mod}2^k))N2^i +$$

$$\sum_{j=1}^{\alpha}(b_j >> (n-j*k)N2^i(>> j*k) \; (\text{mod}2^k)$$

This equation represents a more general definition of the basic SKGE embodiment described at the beginning of this document that used a single bivariate polynomial with $\alpha=1$.

Figure 5:
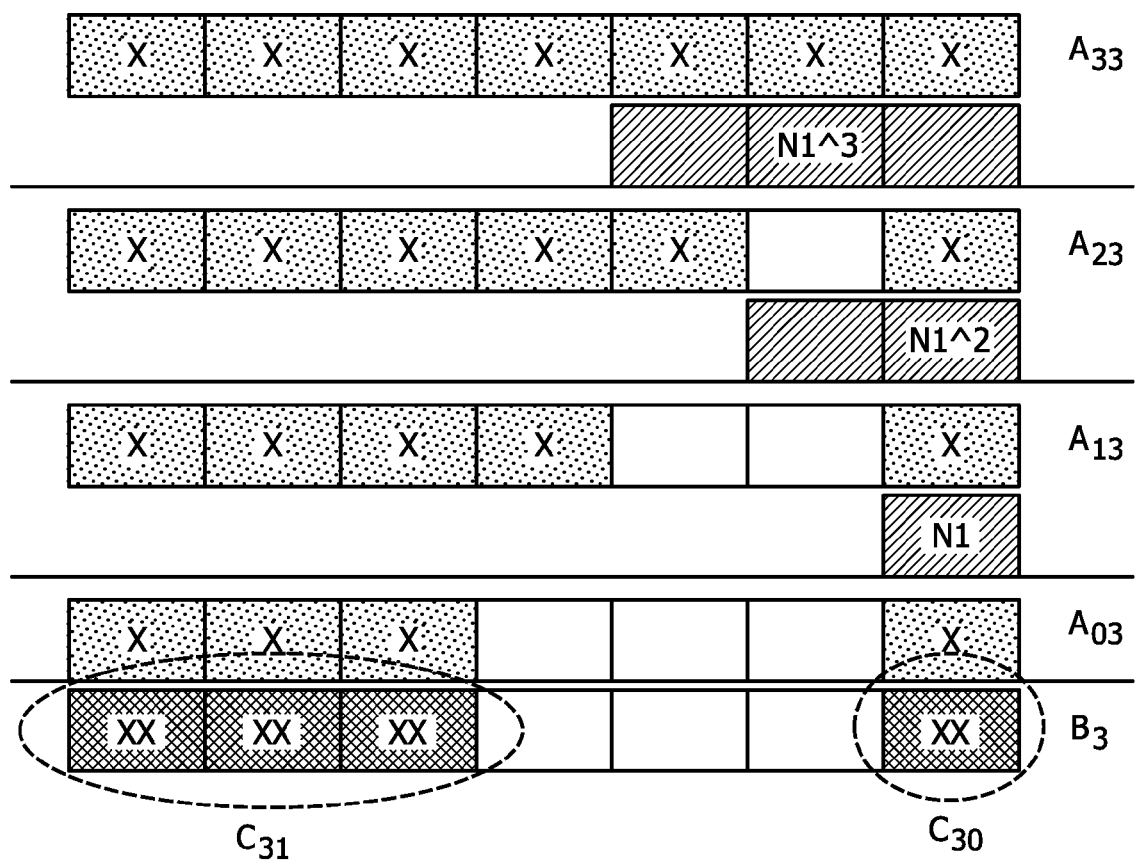
FIG. 5 depicts the bits of the root keying material involved in the generation of some sub-elements of a SKGE when a bivariate polynomial of degree is used as root keying material.

Each of those sub-elements of the SKGE of entity N1 depend on $\alpha+1$ coefficients of the original root bivariate polynomial. FIG. 5 depicts the 4 coefficients of the original root keying material $\{A_{33}, A_{23}, A_{13}, A_{03}\}$ that are involved in the generation of the coefficient $b_3$ of the polynomial share for node N1. We also indicate the two sub-elements $\{C_{30}, C_{31}\}$ of the SKGE that are generated from The coefficients are divided into k-bit blocks. Blocks marked with a X are those involved in the generation of the SKGE elements. These generated SKGE elements are marked with XX.

Additionally, the actual number of bits of the root keying material involved in the generation of a key divided by the size of the generated key increases. Assuming two SKGEs generating a key of the same length but the second SKGE using a root keying material function of a higher degree of complexity e.g., a bivariate polynomials of a higher degree, then the attacker has to determine more information, making it harder. Therefore, the use of more complex mathematical functions as root keying material for a SKGE, as polynomials of high degree, makes harder the recovery of the root keying material. Consequently, it appears that alpha determines the complexity and security of a SKGE.

The coefficients $a_{ij}$ of a bivariate polynomial can be depicted as a symmetric matrix.

$$\begin{pmatrix} \alpha_{00} & \cdots & \alpha_{0\alpha} \\ \vdots & \ddots & \vdots \\ \alpha_{0\alpha} & \cdots & \alpha_{\alpha\alpha} \end{pmatrix}$$

Assuming that the generated key is a k-bit block, the coefficients of a bivariate polynomial of degree $\alpha$ are $2*\alpha+1$ k-bit block long. Here, we use the same ratio as specified above.

For a bivariate polynomial of degree 1, we have four coefficients $\{a_{00}, a_{01}; a_{01}, a_{11}\}$. Each of them is divided into three-bot blocks. This division is useful to analyze which parts of the root keying material have an effect on the bits of the SKGE elements $\{C_0, C_{i0}\}$. This can be understood by, e.g., analyzing FIG. 4b.

Several conclusions can be derived from it:

First, for a polynomial of degree $\alpha$, the elements of the SKGE $\{C_0, C_{i0}\}$, with $1 \leq i \leq \alpha$ are only one block long, but contain the effect of $\alpha+1$, and $$\frac{\alpha^2 + 3\alpha + 2}{2}$$

blocks. The elements $\{C_{i1}\}$, with $1 \leq i \leq a$ of an SKGE of complexity $\alpha$ are i block long, and depend upon $$\frac{(\alpha+1)(2\varepsilon + \alpha)}{2}$$

blocks. Knowing this can be useful if the system want to be attacked, since an attacker might start analyzing those elements of the SKGE that depend on less blocks of the root keying material.

Second, only all the bits of the highest degree coefficient are involved in the generation of the SKGE elements. This is equivalent to say that only a "real" modular operation for that coefficient.

SKGE Based on the Combination of Polynomials Over Two Different Finite Fields

A more complex and secure SKGE can be constructed by taking two bivariate polynomials $f_k(x,y) = \Sigma_{ij}^1 a_{kij} x^i y^j \pmod{q}$ of degree 1 over two different fields $GF(q_1)$ and $GF(q_2)$. In particular, $q_1$ can be taken a Mersenne prime number in the form $2^n-1$ and $q_2$ another prime number in the form $2^n - 2^{\lceil n/3 \rceil} - \beta$. Here, $\beta$ is the smallest positive integer number for which $2^n - 2^{\lceil n/3 \rceil} - \beta$ is a prime number. These particular values are chosen in such a way that:

(i) the polynomial shares generated from those two polynomials include the effect of the different fields, but (ii) the fields are still similar enough to combine some sub-elements of those polynomial shares, and (iii) the SKGE of each entity is created as the combination of sub-elements of polynomials shares generated over two different finite fields. It can be noted that this particular embodiment is for mathematical functions of low complexity, for example polynomials of degree 1, but the combination of different mathematical structures, e.g., fields of different orders, fields and rings, and so on can be done for mathematical structures of higher complexity, e.g., polynomials of higher degree.

Figure 4C:
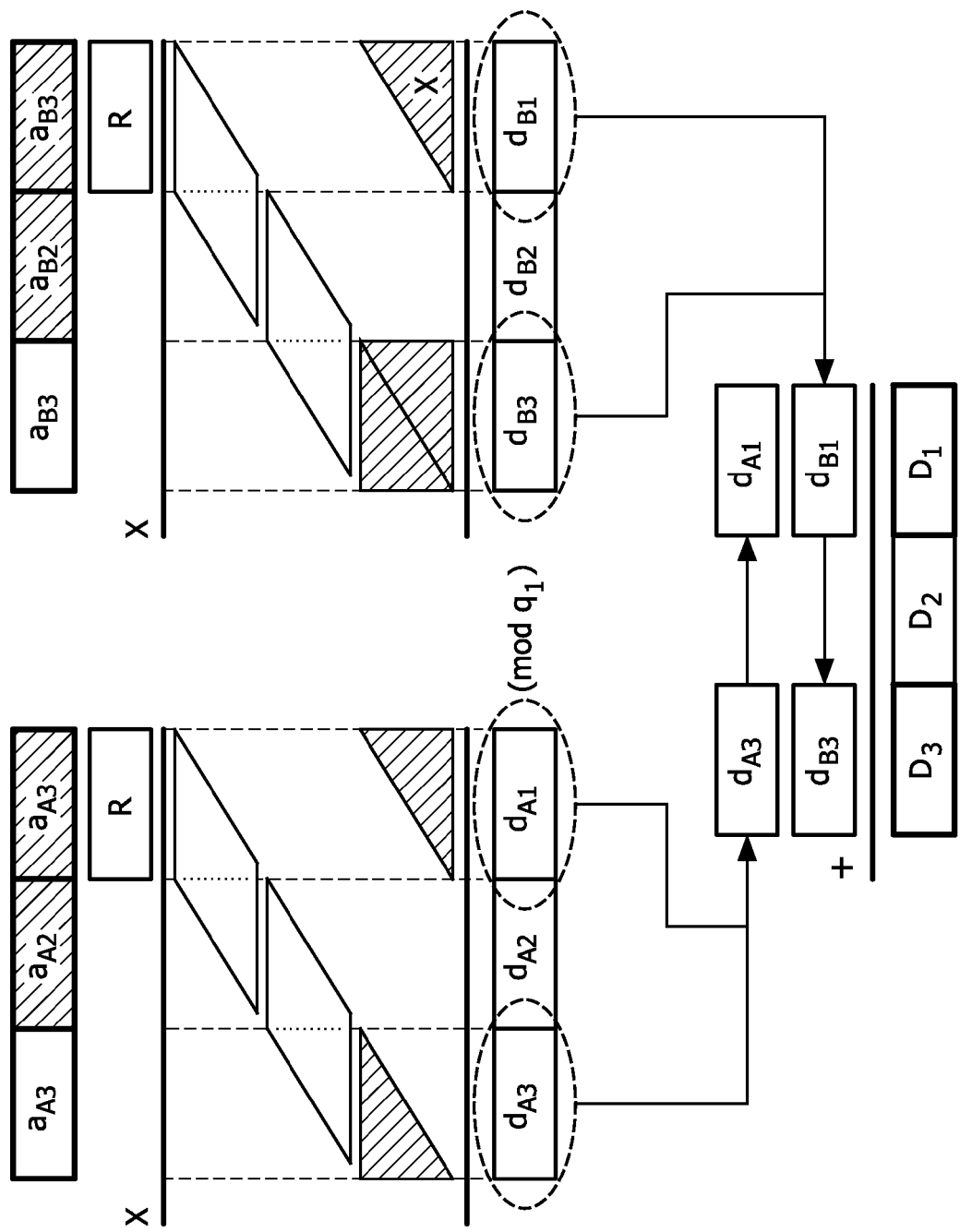
FIG. 4c shows an embodiment of the invention wherein sub-elements chosen from two polynomial shares generated from two different bivariate polynomials over two different finite fields are combined to create the symmetric-key generation engine of entity R. In this figure, we only depict the elements related to the modular multiplications.

The basic concept of this specific embodiment illustrated in FIG. 4 and FIG. 4c. Here, it can be seen the result of multiplying two elements $a_A$ and $a_B$ n bit long times an identifier R [n/3] bit long.

The length of R is chosen in such a way that the non-modular multiplications $R*a_A$ and $R*a_B$ are 4*[n/3] bit long. Due to the special form of the chosen fields, the [n/3] most significant bits of these 4*[n/3] bit long results affect to the [n/3] least significant bits of both results and the [n/3] most significant bits after applying the modular operation in the case of the second field $GF(q_B)$. The left part of FIG. 4 represents, therefore, a multiplication over a finite field $GF(2^n-1)$. This multiplication might be any of the multiplications depicted in FIG. 3 involved in, e.g., the generation of the keying material shares for the entities.

Keeping this in mind, the system operation using this approach works as follows. A configuration entity uses the above two bivariate polynomials to generate a total of four polynomial shares for two entities N1 and N2. This is dones as usual, i.e., by evaluating both bivariate polynomials in the x variable for the identities of both entities. The four polynomial shares are:

$$\partial_{N1|1}(y) = b_{N1|1-1} * y + b_{N1|1-\alpha} \pmod{q_1}$$

$$\partial_{N1|2}(y) = b_{N1|2-1} * y + b_{N1|2-\alpha} \pmod{q_2}$$

$$\partial_{N2|1}(y) = b_{N2|1-1} * y + b_{N2|1-\alpha} \pmod{q_1}$$

$$\partial_{N2|2}(y) = b_{N2|2-1} * y + b_{N2|2-\alpha} \pmod{q_2}$$

Where i and j in $\partial_{Ni|j}(y)$ indicate respectively if the polynomial share belongs to N1 or N2, and if the computations where carried out over $GF(q_1)$ or $GF(q_2)$. Each of the coefficients of these polynomial shares is divided into different sub-elements, as done in the case of the basic embodiment. For instance, $b_{N1|1-0}$ can be seen as the concatenation of three elements, i.e., $b_{N1|1-1} = \{b_{N1|1-1|3} \| b_{N1|1-1|2} \| b_{N1|1-1|1}\}$, where $\|$ is represents concatenation. In the same manner $b_{N1|2-1} = \{b_{N1|2-1|3} \| b_{N1|2-1|3} \| b_{N1|2-1|1}\}$, $b_{N1|2-0} = \{b_{N1|2-0|3} \| b_{N1|2-0|2} \| b_{N1|2-0|1}\}$ and $b_{N1|1-1} = \{b_{N1|1-0|3} \| b_{N1|1-0|2} \| b_{N1|1-0|1}\}$. The configuration entity takes into account the special form of the fields involved to calculate the elements that are going to comprise the SKGE of both entities as a combination of the sub-elements of the polynomial shares. In particular, let us call the three elements of the SKGE of node Ni $\{C_{i-0}, C_{i-10}, C_{i-11}\}$ with $i=\{1,2\}$, then:

$$C_{i-0} = b_{Ni|1-0|1} + b_{Ni|2-0|1}$$

$$C_{i-10} = b_{Ni|1-1|1} + b_{Ni|2-1|1}$$

$$C_{i-11} = b_{Ni|1-1|3} + b_{Ni|2-1|3}$$

The general SKGE operation of node Ni given the identity of another node Nj is as follows in this embodiment:

$$SKGE_{Ni}(N_j) = (C_{i-0} + C_{i-10} * N_j + (C_{i-11} * N_j)(>>k)) \pmod{2^k-1}$$

Observe that the elements $\{C_{i-0}, C_{i-10}, C_{i-11}\}$ of the SKGE are obtained as the addition of two sub-elements coming from different polynomial shares. If we remove the second sub-element in each of those additions, we get back to the basic SKGE embodiment.

This extension introduces interesting features that make an attack against the SKGE hard. The root keying material comprises, in this specific case, polynomials over fields of different order. If an attacker wants to carry out the same attack as for the basic embodiment, he is going to find a main obstacle. Indeed, now he cannot calculate the inverse value of the identifier, since it is an element of two different fields. Additionally, in the previous attack against the basic SKGE it has been mentioned that the security of the system relies on the coefficient $a_{11}$. A detailed analysis shows that in this specific and exemplary embodiment an attacker has to find 4*[n/3] bits instead of n bits, making the system analysis harder. In this sense, a way of measuring the resiliency of a SKGE refers to the ratio between the number of bits of the root keying material involved in the generation of sub-elements comprising the SKGE by the length of those SKGE sub-elements in bits.

This concept can be further extended, by mixing a number of sub-elements generated from more than two keying material shares, such as polynomial shares, and linked to different root keying materials such as bivariate polynomials over different finite fields.

Another extension using several root keying materials over different algebraic structures such as fields refers to that combining prime and extended finite fields, e.g., two fields one using a prime number for the modular operations and another of order p' with p a prime number using a polynomial for the reductions. The reason is that the operations are "incompatible" due to the construction of the fields.

From the above example, it appears that an attacker cannot distinguish whether the sub-elements comprising an SKGE were generated from a single keying material share or a combination of them.

However, the knowledge of this information might allow the attacker to carry a smarter attack to recover the root keying material. This gives the possibility of a further extension that refers to the generation of the SKGE comprising sub-elements from a number of different keying material elements generated from different root keying materials, and keeping the parameters of the root keying material secret. These parameters might refer to the kind of mathematical structure used, e.g., a field, a ring, or a vector space, and the complexity of them, e.g. the size of field or the degree of a polynomial.

Finally, another extension of the system based on the use of several keying material shares originated from different root keying materials refers to the fact that those elements and the operations needed for key generation in the SKGE can be arranged to hide the actual values of the keying material shares. To illustrate this, let us assume four different keying material shares for entity N1 generated from four different root keying materials. Let us assume that from each keying material share are extracted two elements, namely $\{\{C_{i\text{-}0,1}, C_{i\text{-}10,1},\text{-}\},\{C_{i\text{-}0,2},\text{-}C_{i\text{-}11,2}\},\{C_{i\text{-}10,3},C_{i\text{-}11,3}\}\}$, except from the last one from which three are extracted. Let us also assume that the SKGE comprises three different elements $\{C_{i\text{-}0,4}, C_{i\text{-}10,4},C_{i\text{-}11,4}\}$ as in the basic SKGE embodiment and that a key is generated as $SKGN_{Ni}(N_j)=(C_{i\text{-}0}+C_{i\text{-}10}*N_j+(C_{i\text{-}11}*N_j)(>>k))(\bmod\ 2^k-1)$. Here, the actual elements of the SKGE are a combination of the above sub-elements chosen from different keying material shares, in this specific example they are combined as follows:

$$C_{i\text{-}0}=C_{i\text{-}0,1}+C_{i\text{-}0,2}+C_{i\text{-}0,4}$$

$$C_{i\text{-}10}=C_{i\text{-}10,1}+C_{i\text{-}10,3}+C_{i\text{-}0,4}$$

$$C_{i\text{-}0}=C_{i\text{-}11,2}+C_{i\text{-}11,3}+C_{i\text{-}11,4}$$

Since the keying material shares are independent from each other, different sub-elements disturb to each other. Thus, such an approach makes harder recovering the actual original root keying material shares.

A Complete SKGE Design

This SKGE design builds on the two previous designs. This design is motivated by the fact that in an SKGE based on a single bivariate polynomial of degree a, only all the bits of the coefficient $a_{a,a}$ are involved in the computation of the polynomial shares/keys. The reason for this is that the above schemes are designed with a ratio between the field size and key size equal to $$\frac{n}{2\alpha*1}.$$

While the coefficient $a_{a,a}$ includes the effect of a modular operation, the effect of the rest of the coefficient is lesser. Actually, their effect can be compared to that of a non-modular operation. Additionally, only single root keying material is used. Thus, the system is still quite linear.

To address this issue, we describe a complete SKGE design including $\alpha+1$ bivariate polynomials as root keying material of degrees $1, 2, \ldots, \alpha$ and $\alpha$ respectively. In this specific embodiment, these bivariate polynomials are over the following fields:

$f_1(x, y)$ over $GF(2^{3k} - 2^{2k} - \beta_1\ 2^{2k-1} - 1)$ of degree 1.

...

$f_i(x, y)$ over $GF(2^{(2i+1)k} - 2^{(i+1)k} - \beta_i\ 2^{(i+1)k-1} - 1)$ of degree $i$.

...

$f_\alpha(x, y)$ over $GF(2^{(2\alpha+1)k} - 2^{(2\alpha+1)k} - \beta_{(2\alpha+1)}\ 2^{(2\alpha+1)k-1} - 1)$ of degree $\alpha$.

$f_{\alpha+1}(x, y)$ over $GF(2^n - 1)$ of degree $\alpha$, with $2^n - 1$ a prime number bigger than $2^{(2\alpha+1)k}$.

Here, it is assumed that an SKGE generates a key k bit long. The form of the prime number $q_i=2^{(2i+1)k}-2^{(i+1)k}-\beta_i 2^{(i+1)k-1}-1$ for the polynomial of degree i relies on the following facts. The term $2^{(2i+1)k}$ emerges from the desired number of k-bit "blocks" for the coefficients of the root keying material. $2^{(i+1)k}$ is needed to have a modular operation affecting the i most significant k-bit blocks, or in other words, the i*k most significant bits. 1 is chosen to be able to combine operations, i.e, to generate a key by using just a part of the polynomial shares. Finally, the term $\beta_i 2^{(i+1)k-1}$ (is used to find an prime number. The beta value is the smallest positive integer for which the number $\beta_i 2^{(i+1)k-1}$ is a prime number.

The idea is to design a system wherein the modular operations of $f_1(x,y)$ affect to the coefficients of degree 1 of $f_2(x,y)$ and so on; the same for $f_2(x,y)$ and $f_3(x,y)$. In general, the contribution of $f_i(x,y)$ is going to affect all the polynomials with a higher identifier $\{i+1,i+2, \ldots, a+1\}$.

This designs combines the advantages of both above SKGEs and still provides new ones. First, this system is designed in such a way that all the bits of the highest degree coefficient of all the polynomials are involved in the generation of the keys. This is especially important since those coefficients are the ones involving modular operations. Second, fields of different size, measured in bits, are used, thus making the inversion of any element much more difficult. In particular, since the same identifier is used in the generation of the four polynomials, but the polynomials are over different fields, it is much difficult to calculate the inverse element of the identifier to recover parts of or the complete coefficients of the root keying materials. This fact also makes much more difficult interpolation attacks, since now an attacker aims at approximating the SKGE behaviour by means of a polynomial. However, such a polynomial should include the effect of information originated in different fields and influenced by unknown bits. This makes the expected degree of the interpolation polynomial very high, and thus, the system is highly resilient. Third, the order of the fields is chosen in such a way that the sub-elements generated from keying material shares (polynomial shares) coming from different root keying materials (i.e., bivariate polynomials $f_1(x,y),f_2(x,y),\ f_3(x,y)$, or $f_4(x,y)$) perturb to each other, making the recovery of the original root keying material harder. This perturbation effect refers to the effect of the coefficient of highest degree of polynomial $f_i(x,y)$ on the coefficients of the polynomials with a higher identifier such as $f_{i\rightarrow 1}(x,y)$. An additional fact refers to the effect of the modular operations due to the term $-2^{(i+1)k}$ in the prime numbers. These terms strongly affect the elements of the SKGE in the form $C_{i1}$, introducing a non-linear effect that actually comes from different polynomials over different finite fields. The relationship between the other elements $\{C_0, C_{i0}\}$ of the SKGE and the coefficients of the root keying material remains as it was with the difference that these elements also depend on all the a+1 root keying materials. Thus, the operation used in the algorithm for the SKGE remains unchanged respect to the one introduced in the section "SKGE based on polynomials of degree>1". That SKGE:

$$SKGE_{N1}(N2) = b_0 (\text{mod} 2^k) + \sum_{i=1}^{\alpha} (b_i (\text{mod} 2^k)) N_2^i +$$

$$\sum_{j=1}^{\alpha} (b_j \gg (n - j*k) N_2^j (\gg j*k) \ (\text{mod} 2^k)$$

Becomes now:

$$SKGE_{N1}(N2) = C_0 + \sum_{i=1}^{\alpha} C_{i0} * N_2^i + \sum_{j=1}^{\alpha} C_{j1} * N_2^j (\gg j*k) \ (\text{mod} 2^k)$$

Where the elements of the SKGE $\{C_0, C_{i1}, C_{j1}\}$ are generated as the combination of elements of $\alpha$+1 keying material shares following the above approaches. Now, this expression is much harder to be approximated, for instance by means of interpolation techniques, since the elements $C_{j1}$ introduce the non-linear effect of modular operations over different finite fields.

The implementation of the system requires non-modular multiplications of long integers if the complexity of the system grows, i.e., if a long $\alpha$ value is chosen. Here, a trade-off between performance and security is found. The higher the SKGE complexity, the higher the security level. This is comparable with the operation of block ciphers wherein the cipher security depends upon the number of rounds. This trade-off is specially challenging since the number of multiplications grows in an exponential way. This can be understood by analyzing the last term $\sum_{j=1}^{\alpha} C_{j1} * N_2^j (\gg j*k) \ (\text{mod} 2^k)$ of the above SKGE. Element j in the above sum includes the multiplication of two elements j*k bit long. Even though this is a non-modular operation, it is very constly for large values of j. The computation performance also depends on the second term $\sum_{i=1}^{\alpha} C_{i0} * N_2^i$ but not so strongly. For the $i^{th}$ index we have a multiplication of two elements k and i*k bit long. FIG. 9 shows the exponential growth of multiplications. Note that here we refer to the number of k-bit multiplications.

The performance of the system can be optimized by slightly modifying the above SKGE expression, and making some precomputations. We describe three changes or modifications defined as follows:

First, a node N1 can precompute the powers of N2 for both terms $\sum_{j=1}^{\alpha} C_{j1} * N_2^j (\gg j*k) \ (\text{mod} 2^k)$ and $\sum_{i=1}^{\alpha} C_{i0} * N_2^i$. This can be done efficiently by calculating it in a recursive way. This requires a k-bit multiplications. In general: $N_2^i = N_2 * N_2^{i-1}$.

Second, given the above precomputed powers of N2, the contribution of the second term $\sum_{j=1}^{\alpha} C_{j1} * N_2^j (\gg j*k) \ (\text{mod} 2^k)$ in the above SKGE can be calculated as the multiplication of the k least significant bits of the power of $i^{th}$ and the SKGE element $C_{i0}$. This reduces the number of required k-bit multiplications from $\alpha(\alpha+1)/2$ to $\alpha$, i.e., a factor $(\alpha+1)/2$.

The third optimization improves the performance of the third term $\sum_{j=1}^{\alpha} C_{j1} * N_2^j (\gg j*k) \ (\text{mod} 2^k)$ of the above SKGE. To understand this, we can observe the multiplication of two elements A and B 4-k bit long. Here, operands 4-k bit long are chosen, without loss of generality. A and B comprise 4 sub-element, each k-bit long. This multiplication represents a specific multiplication of the term $\sum_{j=1}^{\alpha} C_{j1} * N_2^j (\gg j*k) \ (\text{mod} 2^k)$ when i=4. The result of the multiplication is an 8*k bit long variable C. However, it is not necessary to have the whole C, but only k bits of C. Therefore, the calculation of each of the terms in the sum $\sum_{j=1}^{\alpha} C_{j1} * N_2^j (\gg j*k) \ (\text{mod} 2^k)$ can be substituted by an optimized version. This optimized expression, from the computational point of view, for $C_{j1} * N_2^j (\gg j*k) \ (\text{mod} 2^k)$ is shown below. Note that $c_{j1}$ and $N_2^j$ comprise j k-bit elements each. These elements are $\{C_{j1-j}, C_{j1-j-1}, \ldots, C_{j1-1}\}$ and $\{N_{2-j}^j, N_{2-j-1}^j, \ldots, N_{2-1}^j\}$.

$$\left[\sum_{w=1}^{\alpha-1} C_{j1-w} * N_{2-(j-w-1)}^j\right] (\text{mod} 2^k) + \left[\sum_{w=1}^{\alpha} C_{j1-w} * N_{2-(j-w)}^j\right] (\gg k)$$

This means that this optimized generation of the $j^{th}$ term of the sum $\sum_{j=1}^{\alpha} C_{j1} * N_2^j (\gg j*k) \ (\text{mod} 2^k)$ allows reducing the number of k-bit multiplications from $j^2$ to $2*j-1$. As usual, and as pointed out above, this approximation requires removing some bits of the result since this optimization does not include the effect of previous terms, so that it does not include the effect of carry coming from additions. However, this is a minor fact if k is large enough, and specially if we compare the performance of the system with and without the above three optimizations. These optimizations allows, therefore, for the use of high complexity SKGEs. Here, complexity refers to the complexity to recover the original root bivariate polynomials, since the choice of higher values of a introduce a higher number of polynomials.

All the above teachings can be applied to the design of other SKGEs. Further design approaches include the use of identifiers fullfilling a number of randomness properties to minimize possible attacks against the system, preventing attackers from recovering the original root keying materials. Furthermore, note that the systems described in this document can be easily adapted for key agreement between a higher number of parties by using multivariate functions such as multivariate polynomials.

The technical features described in the present specification may find a wide range of applications.

The main application is the use for security systems implemented in wireless sensor networks. Those networks are, for example:

Medical sensor networks used for pervasive patient monitoring. In those networks, the nodes are generally sensor nodes, arranged on the patient, and having low resources in terms of memory and computational capacities.

Smart environments, such as distributed lighting environments, building automation systems, car equipment networks, or any other network in which access control policies must be set up and observed.

More particularly, any wireless sensor network based on the standard IEEE 802.15.4/ZigBee.

The present invention may also be combined with other systems and methods such as lightweight digital certificates, for example on resource-constrained devices such as sensor nodes or personal digital assistants. A lightweight digital certificate consists of a set of attributes associated with an entity for verifying and authenticating the entity. This set of attributes can include the entity's digital identity (name, profession, etc), access control roles, as well as other parameters.

Moreover, the present invention can open new opportunities in the following areas:

Secure broadcast in wireless sensor networks or telecommunication networks: indeed, a base station in the network may store a root keying material and each node of the plurality of nodes in the network. Thus, the base station can use the root keying material to encrypt messages with an unbreakable keying material share, as provided in the present invention.

Creation of fully secure electronic tickets in different telecom applications.

SKGEs allow for many other applications including counterfeiting. In this application, a different but correlated SKGE might be embedded in each product providing a signature of the uniqueness of the product. For instance, in a digital document we could have the original digital sequence, e.g., of a digital picture, slightly modified by means of a random sequence. For instance, it is possible to randomly modify the least significant bits of some pixels in the digital image. Fingerprint of this information can be determined by calculating the hash function, and use the output of the hash to generate the elements of an SKGE from the secret root keying material for that digital document. The elements of the generated SKGE are embedded in the same digital document, e.g., in the last significant bits of some pixels of a digital image. This approach allows for counterfeiting based on the use of SKGEs—copied digital documents can be tracked and fake documents do not include a valid SKGE.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of secure communications and which may be used instead of or in addition to features already described herein.

The invention claimed is:

1. A method for securing communications between a first node and a second node in a network comprising a management device provided with root keying materials, the method comprising:
the management device generating, based on the root keying materials, a first node keying material shares comprising a number of sub-elements and the first node keying material shares being arranged for generating a first complete key,
the management device selecting a subset of sub-elements of the first keying material shares, the number of sub-elements selected being less than the total number of sub-elements of the first keying material shares, and the selected sub-elements forming a first node symmetric-key generation engine,
the management device distributing the first node symmetric-key generation engine to the first node, and
the first node generating, based on the first node symmetric-key generation engine and on an identifier of the second node, a first key used for securing communications with the second node.

2. The method of claim 1, wherein the root keying material comprises a number of mathematical functions.

3. The method of claim 2, wherein the performance and security of the symmetric-key generation engine are defined by a number of secrets or public designs including the number of root mathematical functions, the complexity of the mathematical functions, the mathematical structures over which the generation of the keying material shares takes place, or the parameters of the root keying material.

4. The method of claim 2, wherein the mathematical functions are polynomials.

5. The method of claim 4, further comprising:
the management device generating, based on the polynomial root keying material and on an identifier of the first node, a first node keying material shares under the form of a number of polynomial shares, each polynomial share coefficient being divided into sub-elements, and the sub-elements comprising the first node keying material shares,
the management device selecting a set of sub-elements of the first polynomial coefficients forming a first symmetric-key generation engine, the selected sub-elements of the first node symmetric-key generation engine corresponding to the selected sub-elements of the first node keying material share,
the first node generating, based on a first node symmetric key generation engine and on an identifier of a first node, a partial key, used for securing communications with the second node.

6. The method of claim 4, wherein the root keying material are polynomials over a number of finite fields chosen in such a way that:
the management device generates polynomials shares for the first node from the root polynomials carrying out operations over different finite fields;
the management device can divide the polynomial shares into sub-elements and combine them to form a symmetric-key generation engine;
the sub-elements comprising the symmetric-key generation engine are combined making harder the recovery of the root keying material;
the first node can use its symmetric-key generation engine and the identifier of the second node to generate a key with the second node;
the operations required for key generation are out of the fields.

7. The method of claim 2, wherein the complexity of the mathematical functions can be adjusted to offer a trade-off between the symmetric key generation engine security and computational requirements.

8. The methods of claim 4, wherein the complexity of the mathematical functions refers to the polynomial degree or size of the finite fields.

9. The methods of claim 1, wherein the generation of keying material shares for the first node from the root mathematical functions includes operations over a single or a combination of mathematical structures comprising fields, rings, vector spaces and groups.

10. The method of claim 9, wherein the operations needed for the generation of a key between the first node given the symmetric-key generation engine of the first node and an identifier of the second node are over a common mathematical structure.

11. The method of claim 3, wherein the management device generating the first node keying material share or the second node keying material share comprises evaluating the symmetric bivariate polynomial in a point corresponding to the identifier of the first node or the identifier of the second node, respectively.

12. The method of claim 1, wherein the symmetric-key generation engine is implemented in hardware or software, and allows the first node to compute a symmetric-key with the second node given the identifier of the second node.

13. A network of devices comprising a management device and a node, provided with an identifier, the management device comprising a first processor and a first memory, the first processor configured to:
  generate, upon receipt of the identifier of the node, node keying material shares based on the root keying material, each keying material share being divided into sub-elements;
  select a subset of sub-elements of the first keying material share, the number of sub-elements selected being less than the total number of sub-elements of the keying material share to form a node symmetric-key generation engine adapted for generating a first key, and
  distribute the node symmetric-key generation engine to the node; the node comprising a second processor and a second memory, the second processor configured to:
  transmit its identifier to the management device,
  receive, from the management device, a node symmetric-key generation engine,
  receive an identifier of the another node, and
  generate, based on the received node symmetric-key generation engine and the received other node's identifier, a key for communicating with the other node.

* * * * *